Sept. 21, 1954     R. G. BEGEMAN ET AL     2,689,511
ROW CROP CHOPPING AND WEEDING TOOL Filed Aug. 14, 1950     3 Sheets-Sheet 2

INVENTOR.
ROBERT G. BEGEMAN
R. E. POWELL
BY
ATTORNEY

Sept. 21, 1954  R. G. BEGEMAN ET AL  2,689,511
ROW CROP CHOPPING AND WEEDING TOOL
Filed Aug. 14, 1950  3 Sheets-Sheet 3
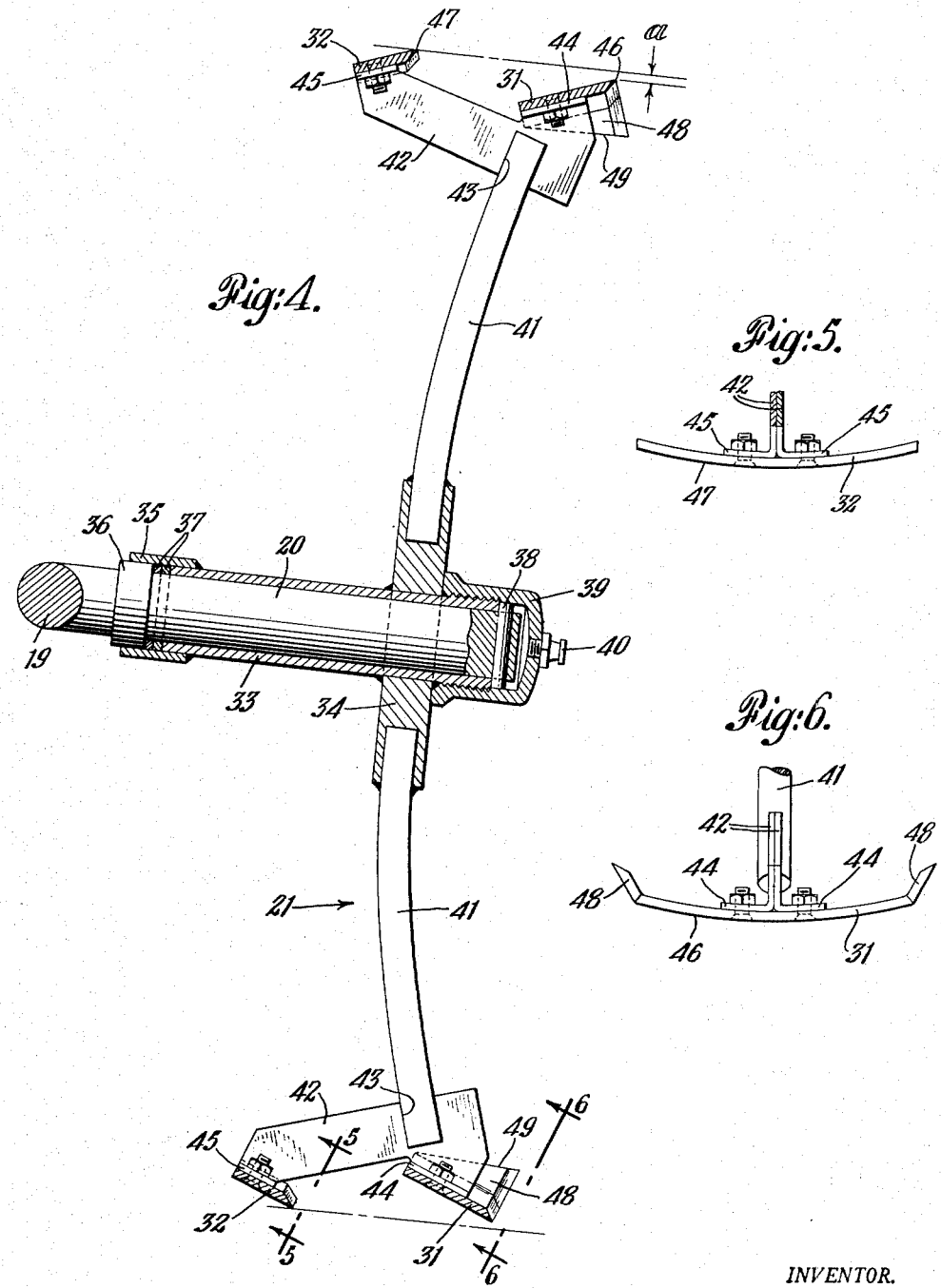
INVENTOR.
ROBERT G. BEGEMAN
R. E. POWELL
BY
Donald W. Robertson
ATTORNEY Patented Sept. 21, 1954

2,689,511

UNITED STATES PATENT OFFICE 2,689,511

ROW CROP CHOPPING AND WEEDING TOOL

Robert G. Begeman, Lonoke, and R. E. Powell, North Little Rock, Ark., assignors to B & P Farm Tool Company, Little Rock, Ark., a corporation of Arkansas Application August 14, 1950, Serial No. 179,242

9 Claims. (Cl. 97—22)

The invention relates to a chopping and weeding tool for attachment to the cultivator beam of tractors to chop or thin row crops such as cotton, sugar beets, lettuce and so forth.

Summary

Our invention comprises a chopper wheel having cutting blades mounted in pairs around its periphery and forming two substantially parallel series of blades with forwardly directed cutting edges, and supporting structure for mounting the wheel on the cultivator beam of a tractor in such a manner as not to interfere with the cultivating tools, thus permitting chopping and cultivation to be carried out at the same time and in a single operation. The supporting structure includes an axle for the wheel and a pivotal mounting for the axle, the pivotal mounting being at an angle substantially removed from the vertical and the axis of the axle being disposed at an acute angle to the axis of the pivotal mounting, whereby the plane of the wheel is automatically adjustable with respect to the vertical to vary the relative depths of cut taken by the blades of the two series. Also it is particularly advantageous to have the axis of the axle disposed at an angle in both vertical and horizontal directions relative to the axis of the pivotal mounting. A spring is arranged to urge the axle downwardly about the axis of its pivotal mounting aforesaid to control the overall depth of cut, and an adjustable stop limits the depth of cut to a predetermined maximum.

A particular feature of our invention concerns the form and construction of the chopper wheel with its two parallel series of cutting blades. We have found that the design of the blades and the arrangement of the two series of blades with respect to one another is of considerable importance in securing good operation. We employ elongated blades extending lengthwise in the general direction of rotation of the wheel and extending crosswise at an angle to the axis of rotation of the wheel. The forward edges of the blades are sharpened and located farther from the axis of the wheel than are the rearward edges of the blades. This means that the individual blades incline forwardly and downwardly as they are driven through the soil by the forward motion of the tractor.

In our preferred construction, the forward edges of the leading series of blades are closer to the axis of the wheel than are the forward edges of the trailing series of blades. However, since the wheel can be inclined to the vertical, the leading series of blades may make the deeper cut of the two. Also, in our preferred construction, the ends of the blades are turned inwardly at an angle, and these ends are pointed. We have found that this is quite effective in keeping the ground from flaking at the sides of the cut, and our chopper has proved extremely valuable in overcoming trouble heretofore experienced in chopping cotton growing in crusty soils such as the adobe soils of Colorado and southern California, and in the buckshot and gumbo soils of Texas, Arkansas, Louisiana and Mississippi.

Other features and advantages of our invention will appear in the following detailed description of the particular form of our invention which we now consider to be its best embodiment.

Description

Fig. 4 is an enlarged vertical cross-sectional view through the wheel and axle, taken as indicated at 4—4 in Fig. 3.

Figs. 5 and 6 are detail views of the blades of the chopper wheel, taken as indicated in Fig. 4 at 5—5 and 6—6, respectively.

Figure 1:
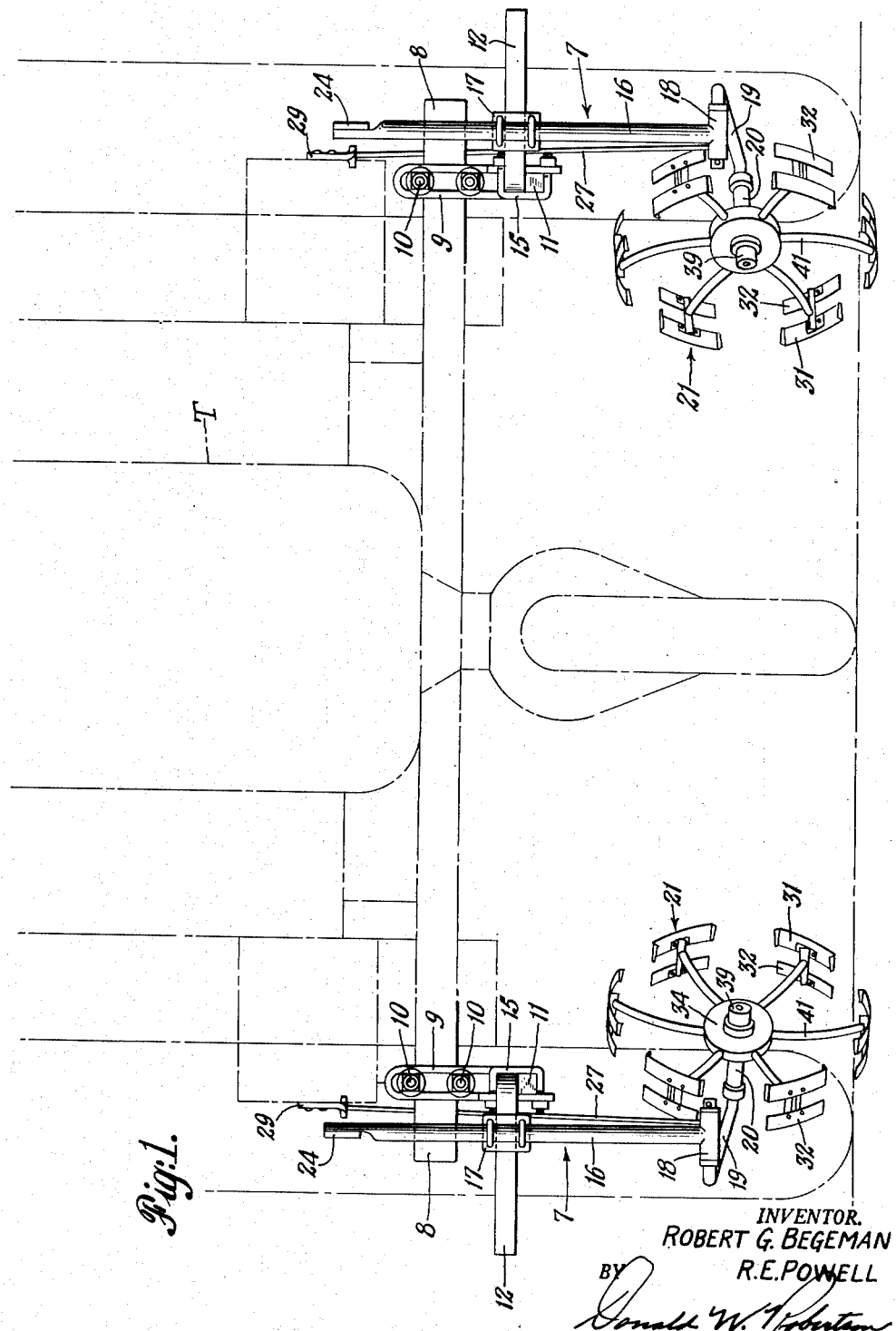
Fig. 1 is a front elevational view of the chopper wheels and associated supporting, clamping and depth control mechanism, as mounted at the respective ends of the cultivator beam of a conventional form of tractor.
Figure 2:
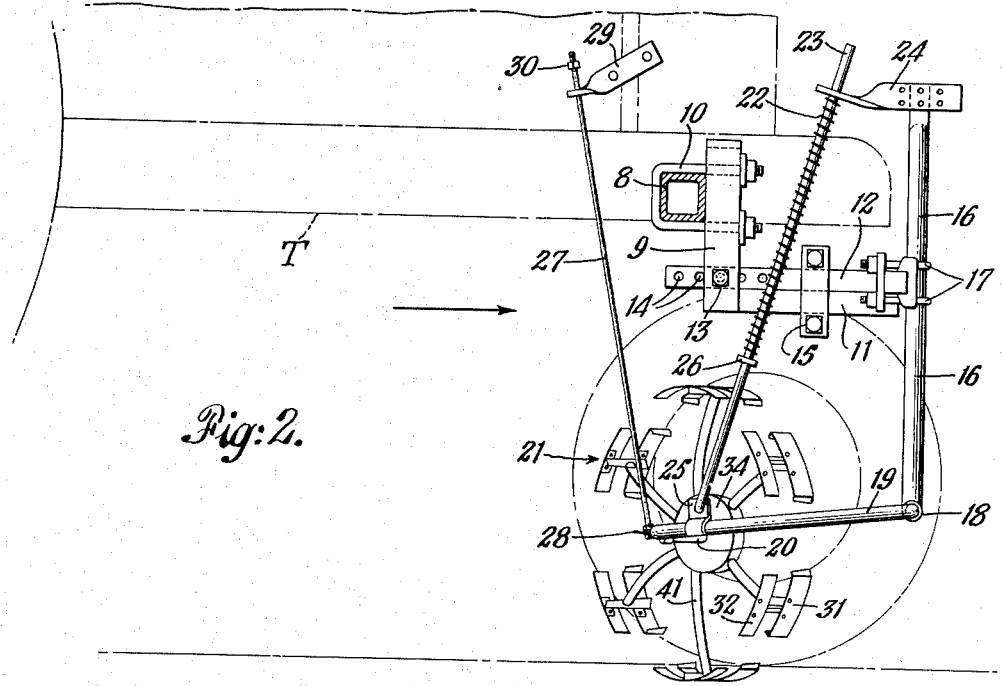
Fig. 2 is a side elevational view of the same.
Figure 3:
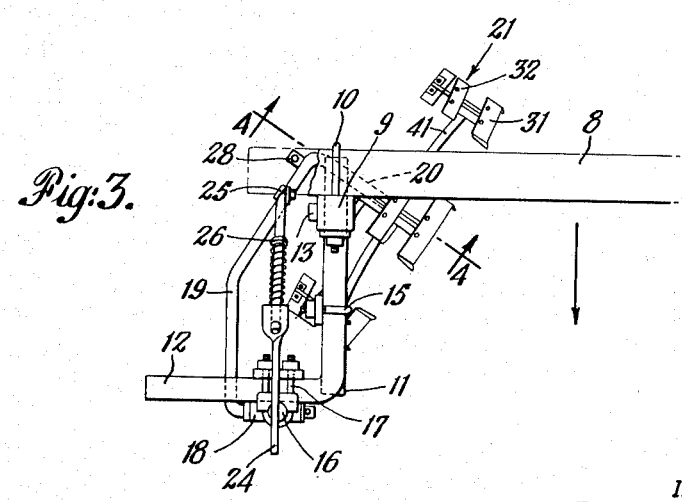
Fig. 3 is a plan view showing details of the supporting structure for one of the chopper wheels.

In Figs. 1 and 2, our chopper attachments, indicated generally at 7, are shown affixed to the cultivator beam 8 of a tractor T sketched in outline with light dot-dash lines. Ordinarily the tractor is driven between the rows of cotton (or other crop being blocked or thinned) and cultivates the two rows on either side. The main rear drive wheels of the tractor straddle the two rows and the front wheel or wheels go down the middle, while the cultivator attachments extend in line with the rows, rearwardly of the main cultivator beam 8. Our chopper attachments preferably are approximately below the beam and are carried on supports extending forwardly, and thence downwardly and rearwardly with respect to the beam. Inasmuch as the chopper attachments on either side of the tractor are alike, except for right or left hand mounting as the case may be, it will suffice to describe here just one attachment, and it will be understood that the description is applicable to both.

An inverted U-shaped bracket 9 is secured to the front of beam 8 by means of a U-bolt 10, the washers of the fastenings straddling the legs of bracket 9 as clearly shown in Fig. 1. Welded to the inside of the bottom of bracket 9, and projecting forwardly therefrom, is a horizontal supporting arm 11. On this arm rests one leg of an L-shaped bracket 12, and this leg extends between the legs of bracket 9 to which it is adjustably secured by a bolt 13 passing through holes in bracket 9 and any one of a series of holes 14 in bracket 12. Bracket 12 also is fastened to arm 11 by a suitable clamp 15. The other leg of bracket 12 extends outwardly at the side of the tractor, and to it is adjustably secured a vertical support 16 by means of a suitable clamp indicated generally at 17 and consisting of a pair of U bolts, one above and one below the bracket 12, passing through clamping plates on each side of the bracket, one of these clamping plates being appropriately recessed to mate with support 16.

At the lower end of vertical support 16 is fixed a transverse bearing member 18 providing a pivotal mounting for the axle of the chopper wheel. This pivotal mounting is at an angle substantially removed from the vertical and the axis of the axle 20 is disposed at an acute angle to the axis of the pivotal mounting provided by bearing member 18 aforesaid. The result of this particular arrangement is that the plane of the wheel is automatically adjustable with respect to the vertical to vary the relative depths of cut taken by the blades of the respective parallel series of elongated cutting blades 31, 32. Also the axis of the axle 20 is disposed at an angle in both vertical and horizontal directions relative to the axis of the pivotal mounting provided by bearing member 18 aforesaid. The specific mounting has a particular relationship to the specific chopper wheel in that the operation of the mounting affects the relative disposition of the two series of blades. The way the mounting works is this: as axle 20 of the chopper wheel raises and lowers around the axis of bearing member 18, the disposition of axle 20 with respect to the horizontal changes due to the fact that the respective axes of the axle and its pivotal mounting are arranged at an acute angle to one another, and further due to the fact that these axes are angularly disposed relative to one another in both vertical and horizontal directions. This change in the disposition of axle 20 cants or tilts the chopper wheel so that the plane of the wheel changes with respect to the vertical. This in turn has the effect of varying the relative depths of cut taken by the blades 31 and 32 of the respective parallel series.

With the wheel tilted at the angle shown in Fig. 4, it will be seen that the blades 32 of the trailing series are taking a deeper cut than are the blades 31 of the leading series. Now, if the wheel is raised somewhat about the bearing member 18, the plane of the wheel will be brought more nearly to the vertical and the result of this would be to increase the differential between the depths of cut taken by the blades of the respective series. Conversely, if the wheel is lowered somewhat from the position shown in Fig. 4, the angle of tilt will be increased and this will have the effect of decreasing the differential between the depths of cut taken by the blades of the respective series. In the construction shown, a wheel supporting member 19 extends through bearing member 18, and thence extends rearwardly, inwardly and downwardly, terminating in an axle portion 20 on which chopper wheel 21 is mounted. A compression coil spring 22 is arranged to urge the axle downwardly about the axis of the pivotal mounting of member 19 in bearing 18 to control the overall depth of cut. Passing through the coil spring 22 is a rod 23, guided near its upper end where it passes through a hole in a bracket 24 adjustably fastened to the upper end of vertical support 16, and pivoted at its lower end to a bracket 25 fixed to wheel supporting member 19. The spring bears at one end against the aforesaid bracket 24 and at its other end against a stop lug or nut 26 which may be adjustably mounted on rod 23 to regulate the thrust of the spring. Another rod 27 furnishes an adjustable stop for limiting the depth of cut to a predetermined maximum. This rod is secured at its lower end to a lug 28 welded to member 19, and at its upper end passes freely through a hole in a bracket 29 fastened to the tractor. A lock nut or pair of lock nuts 30 adjustably regulates the maximum depth of cut, i. e. the lowermost position of the chopper wheel.

Referring more particularly to Figs. 4, 5 and 6, we shall now describe the preferred construction of our novel form of chopper wheel. It comprises, in its general arrangement, elongated cutting blades 31, 32, mounted in pairs around the periphery of the wheel and forming two substantially parallel series of blades. The blades extend lengthwise in the general direction of rotation of the wheel and crosswise at an angle to the axis of rotation of the wheel. In our preferred construction as illustrated the hub assembly comprises a sleeve 33 to which is welded a disc 34 and a collar 35 arranged to extend partly over an end-thrust bearing 36 fixed to axle portion 20 of wheel supporting member 19. Washers or shims 37 are arranged between the inner end of sleeve 33 and thrust bearing 36. The wheel is suitably secured in place on the axle as by means of a pin 38 passing through a hole drilled near the outer end of the axle, and this pin is held in position by a hub cap 39 screwed on the outer end of sleeve 33 and bearing against disc 34. A suitable fitting 40 may be provided for lubrication of the wheel bearing with the use of the usual grease gun. Disc 34 of the hub assembly is drilled to receive the inner ends of spokes 41 which may be welded in place as shown in Fig. 4. Plates 42 have cut-out portions 43 to receive the outer ends of the respective spokes to which they are welded. There is a pair of these plates for each spoke, and each plate has two outwardly bent flanges 44, 45, arranged at an acute angle to the axis of rotation of the wheel. Blades 31 and 32 are bolted to the pairs of flanges 44 and 45, respectively in the manner clearly shown in Figs. 4, 5 and 6. The leading edges of blades 31 and 32 are sharpened to furnish cutting edges 46 and 47. The blades thus have the cutting edges of both series, or rows, forwardly directed. The leading blades 31 preferably are somewhat wider than the trailing blades 32 as seen in Fig. 4.

Referring to Fig. 6, which is a detail view of one of the leading blades, note the inwardly turned ends 48. These inwardly turned ends preferably are longer at the leading edge of the blade than at the trailing edge thereof as seen best in Fig. 4 (note the sloping edge 49). Thus the leading blades have pointed inwardly turned ends.

Attention is directed to the fact that the forward edges 46 of the leading series of blades are closer to the axis of the wheel than are the forward edges 47 of the trailing series of blades (see a, Fig. 4). That is, the overall diameter of the trailing series of blades is greater than that of the leading series. For example, we have obtained excellent results with a wheel in which these diameters are 17¼" and 17", respectively.

The chopper wheels and supporting structure as described preferably are completely assembled before being mounted on the tractor. Thus, the complete attachment can be easily and quickly mounted on any tractor cultivator beam by fastening the clamps 10 and 29. It is not necessary to remove and then re-set the cultivating tools.

The wheels of our attachment are well adapted to both chopping and blocking of crops. The round spokes 41 help to avoid pulling or damaging the young plants left in the hill. The two parallel series of cutting blades, one following directly in the path of the other, make a double cut which together produce a wide, clean cut of 6 to 8 inches across the row, removing excess plants, weeds and grass between the hills, and also performing an effective mulching job at all cultivating speeds.

The wheels are ground driven by positive traction, and clean and cultivate the soil as they cut across the row, making an evenly-spaced, definite pattern of hills with an average of two to three stalks per hill (where used in chopping cotton), and are fully adjustable. Changing the angle of the wheels in relation to the row will change the down-the-row spacing of the plants. It will be understood that various changes can be made in the design of the wheels without departing from our invention. The six-spoke wheel illustrated in the drawing is well adapted for cutting spaces 9 to 12 inches wide. We have found that where it is desired to cut spaces 6 to 9 inches an eight-spoke wheel is to be preferred, i. e., a wheel having two parallel series of eight blades each, or eight pairs of blades in all. Where it is desired to cut spaces more than 6 inches wide, a twelve-spoke wheel may be used to advantage, and for spaces 3 to 5 inches wide we recommend using a fourteen-spoke wheel. The wheels are interchangeable. Wheels making longer down-the-row spacings are generally used in chopping cotton, and wheels making shorter spacings are generally used in thinning sugar beets, lettuce, carrots, field seeded tomatoes, broccoli and other row-crop vegetables. Our chopper wheels may also be designed for mounting on the cultivator tool clamp of tractors for use by those farmers who prefer to chop independently of cultivation.

The terms and expressions which we have employed are used in a descriptive and not a limiting sense, and we have no intention of excluding such equivalents of the invention described, or of portions thereof, as fall within the purview of the claims.

We claim:

1. A row crop chopper for attachment to the cultivator beam of a tractor, comprising a chopper wheel having cutting blades mounted in pairs around its periphery and forming two substantially parallel series of blades with forwardly directed cutting edges, and supporting structure for mounting said wheel on the cultivator beam, said supporting structure including an axle and a pivotal mounting for said axle, said pivotal mounting being at an angle substantially removed from the vertical and the axis of said axle being disposed at an acute angle to the axis of said pivotal mounting, whereby the plane of the wheel is automatically adjustable with respect to the vertical to vary the relative depths of cut taken by the blades of the respective parallel series.

2. A row crop chopper for attachment to the cultivator beam of a tractor, comprising a chopper wheel having cutting blades mounted in pairs around its periphery and forming two substantially parallel series of blades with forwardly directed cutting edges, and supporting structure for mounting said wheel on the cultivator beam, said supporting structure including an axle and a pivotal mounting for said axle, said pivotal mounting being at an angle substantially removed from the vertical and the axis of said axle being disposed at an angle in both vertical and horizontal directions relative to the axis of said pivotal mounting.

3. A row crop chopper as defined by claim 1 which includes a spring arranged to urge said axle downwardly about the axis of said pivotal mounting, and an adjustable stop for limiting the depth of cut to a predetermined maximum.

4. A chopper wheel having leading and trailing elongated cutting blades, said blades being mounted in pairs around its periphery and forming two substantially parallel series, the blades extending lengthwise in the general direction of rotation of the chopper wheel and the blades of the leading series being wider than the blades of the trailing series.

5. A chopper wheel having leading and trailing elongated cutting blades, said blades being mounted in pairs around its periphery and forming two substantially parallel series, the blades extending lengthwise in the general direction of rotation of the chopper wheel and the blades of the leading series being wider than the blades of the trailing series, and the blades of the leading series having pointed inwardly turned ends.

6. A row crop chopper for attachment to the cultivator beam of a tractor, comprising a chopper wheel having parallel rows of cutting blades mounted in pairs around its periphery, said blades having cutting edges of both rows forwardly directed, and said blades extending lengthwise in the general direction of rotation of the chopper wheel.

7. A row crop chopper for attachment to the cultivator beam of a tractor, comprising a chopper wheel having parallel rows of cutting blades mounted in pairs around its periphery, said blades having cutting edges of both rows forwardly directed, and said blades extending crosswise at an angle to the direction of forward movement of the chopper wheel.

8. A chopper wheel having leading and trailing cutting blades mounted in pairs around its periphery and forming two substantially parallel series of blades, the diameter of the trailing series of blades being greater than the diameter of the leading series of blades, and the blades of the leading series extending lengthwise in the general direction of rotation of the chopper wheel and having ends turned inwardly toward the center of the wheel.

9. A row crop chopper for attachment to the cultivator beam of a tractor, comprising a chopper wheel having parallel rows of cutting blades mounted around its periphery, said blades arranged with each blade of one of said parallel rows opposite and parallel to a blade of the other of said parallel rows, and the blades of both rows having cutting edges forwardly directed.

References Cited in the file of this patent

UNITED STATES PATENTS

| Number | Name | Date |
|---|---|---|
| 380,429 | Fleming | Apr. 3, 1888 |
| 401,378 | Soddlemyre | Apr. 16, 1889 |
| 1,300,133 | Dewey | Apr. 8, 1919 |
| 1,493,078 | Key | May 6, 1924 |
| 2,137,233 | Brotzman | Nov. 22, 1938 |
| 2,491,304 | Evans | Dec. 13, 1949 |
| 2,505,560 | Mayberry | Apr. 25, 1950 |
| 2,528,897 | Mayfield | Nov. 7, 1950 |
| 2,559,048 | Seaman | July 3, 1951 |

FOREIGN PATENTS

| Number | Country | Date |
|---|---|---|
| 22,829 | Norway | Dec. 2, 1912 |
| 57,447 | Austria | Jan. 25, 1913 |
| 292,130 | Germany | Feb. 6, 1920 |